INVENTOR.
JEAN F. MARCHAND

United States Patent Office 3,238,514
Patented Mar. 1, 1966

3,238,514
DISPLACEMENT OF PERSISTENT CURRENTS BY MEANS OF RADIANT ENERGY
Jean Francois Marchand, Emmasingel, Eindhoven, Netherlands, assignor to North American Philips Company, Inc., New York, N.Y., a corporation of Delaware
Filed July 22, 1963, Ser. No. 296,587
Claims priority, application Netherlands, July 24, 1962, 281,343
10 Claims. (Cl. 340—173.1)

This invention relates to a device for displacing the position of a persistent current in a thin layer of superconducting material.

It is known that certain substances such as lead and tin, also termed superconductors, have the property that below a given critical temperature of a few degrees Kelvin their resistivity is equal to zero and that under the action of a magnetic field, the intensity of which exceeds a given critical value and which field may, if desired, be produced by a current in the conductor itself, the conductor can be brought back to a state of finite or "normal" conductivity. It is another property of superconductors that they are impermeable to magnetic lines of force with the exception of a very thin layer at the surface. Consequently, a magnetic field can exist in superconductors only at places where the material is normally conducting. It is known that in thin layers of superconducting material persistent currents may occur in the form of a thin current path around a region of normally conducting material, the magnetic flux produced by the circular current penetrating the conductor in the normally conducting region and the magnetic field intensity in this region being equal to the critical field intensity. The circular current persists and its intensity does not decrease in spite of the presence of normally conducting material since a decrease in current or a shrinkage of the region would mean a variation in the magnetic flux, which is not possible, since it is surrounded by a closed circuit of superconducting material.

Such a magnetic flux, which penetrates the superconducting layer and which is sometimes referred to as the "Meissner spot" can, in general, not be produced by moving a magnet into the neighbourhood of the superconducting layer. Thus circular currents will, indeed, be produced in the layer, but they are such that the magnetic flux remains zero.

The invention provides a simple means for displacing and producing Meissner spots such that they may advantageously be utilized as storage elements.

It should be noted that it is known per se that superconducting material can be rendered normally conducting by the incidence of visible or invisible light or by thermal radiation.

In accordance with the invention persistent currents in a thin layer of superconducting material can be displaced by providing means for displacing a light spot along the surface of the superconducting layer. It has been found that by directing a light ray on a Meissner spot said spot follows the movement of the produced light spot. In principle the surface area of the light spot may be larger or smaller than or equal to the surface area of the Meissner spot.

According to a further aspect of the invention a Meissner spot can be produced by producing a magnetic field at least at one place along the edge of the thin layer; if desired, the intensity of said field may be lower than the critical value. By directing the light ray on this portion of the layer and by moving it subsequently to another, given, desired portion of the layer, a magnetic flux is transferred by the light ray to said desired portion and is maintained after the light is extinguished since it is surrounded by superconducting material.

The invention will be described more fully with reference to the drawing, wherein.

Figure 1:
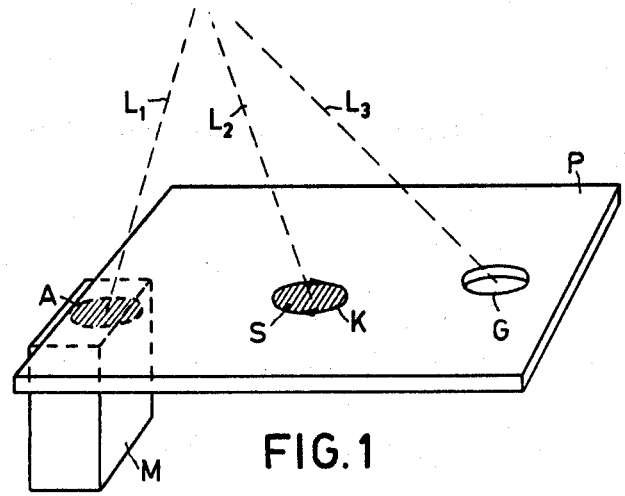
FIG. 1 is a diagrammatic representation of apparatus which may be used in accordance with the invention.

Referring to FIG. 1 reference P designates a thin layer of superconducting material, for example tin, applied to a support (not shown), for example of quartz and cooled by means (not shown) to below the critical temperature. The thickness of the layer may be of the order of 1000 A. Beneath the layer P, in the proximity of the left-hand edge, there is arranged a magnet M. The intensity of the magnetic field produced by the magnet is preferably lower than the critical field intensity, but it may, if desired, be higher. When a light ray L1 is directed to the magnetic region A and then displaced to the position L2, it has been observed that at the portion S where light ray L2 is directed, a Meissner spot is produced; in other words, at portion S a magnetic field will exist which penetrates the layer P and is maintained by a circular current K. The Meissner spot thus formed remains after the light is extinguished; the surface of the normally conducting region will be reduced, it is true, to the extent that the intensity of the magnetic field is equal to the critical value, but the total captured magnetic flux does not vary, since the Meissner spot is surrounded by a closed circuit of superconducting material.

Figure 2:
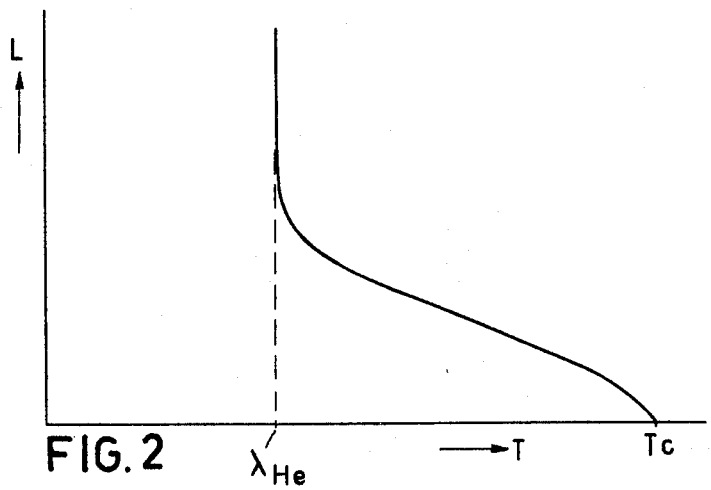
FIG. 2 is a graph of minimum light intensity as a function of temperature.

This phenomenon may be accounted for by the fact that the superconducting layer P becomes normally conducting under the action of the incident light. The temperature must be below the critical temperature, but the required light intensity is less as the temperature approaches the critical value. This is shown in FIG. 2 where the minimum light intensity L required for rendering the material normally conducting is plotted on the ordinate and the temperature T is plotted on the abscissa. $T_c$ designates the critical temperature and $\gamma H_c$ the $\gamma$-point of liquid helium, i.e., the temperature below which the thermal conductivity is infinite. The displaceable light ray may be obtained by means of a cathode-ray tube, the light screen of which is projected by means of a lens system onto the superconducting layer.

Other Meissner spots may be produced in the manner described above by directing a light ray to the edge of the superconducting layer P and by subsequently shifting the light ray to the desired portion. In general, these spots can react with each other, when they approach each other, so that their place is shifted. When Meissner spots are employed as carriers of binary information, this is not desirable, since the written information will then no longer be found at the same place. It is then desirable to provide given preference places for the magnetic spots on the layer P, from where they cannot be modified under the action of the neighboring spots; for the purpose, they may take the form of apertures or thinned places in the superconducting layer P. FIG. 1 shows such an aperture G, towards which the Meissner spot can be shifted by bringing the light ray into the position L3. The aperture G may, in principle, be larger or smaller than the natural diameter of the Meissner spot. In the first case the persistent current travels along the edge of the aperture and the field intensity is lower than the critical value, while in the second case the persistent current will enclose the aperture G so that there is still a region of normally conducting material.

Figure 3:
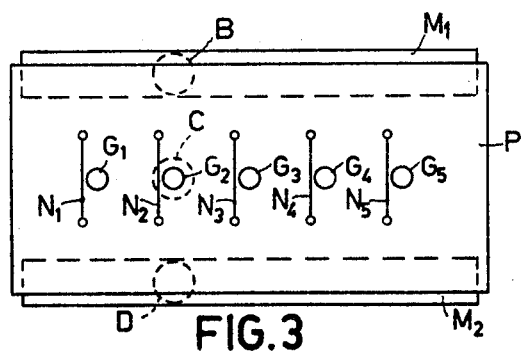
FIG. 3 is a diagrammatic representation of apparatus according to the invention for recording information in a number of storage positions.

FIG. 3 shows diagrammatically a device for recording information with five storage places G1, G2, G3, G4 and G5 in the thin layer P of superconducting material. Magnets M1 and M2 arranged at the rear side of the layer P at the upper edge and at the lower edge; with respect to the normal to the surface the directions of the magnetic fluxes of said magnets are opposite each other. In the blank state of the storage surface, there is no magnetic flux in the apertures G1 to G5; this corresponds to the storage elements being in the state 0.

For writing the information 1 in one of the storage elements, for example G2, a light ray is directed onto the portion B near the magnet M1 after which and then the light spot is shifted towards the position C around the aperture G2. At the side of the apertures G1 to G5, on the front side or on the rear side of the plate P, there are arranged reading conductors N1 to N5, which may be connected in series with each other and which are connected to an indicator in a manner not shown. After the Meissner spot has been displaced towards the aperture G2 and the light has been distinguished, the surface of the magnetic region shrinks down to the aperture G2. If it is afterwards desired to read the information from the aperture G2, the light ray is directed thereon, so that the magnetic region expands to the size of the light spot C, so that an inductance voltage is produced in the reading conductor N2. No inductance pulse will be produced, when the light ray is directed towards an aperture where no magnetic flux prevails. When the information 1 in the aperture G2 is to be erased, the light ray is directed on the portion D at the magnet M2, after which the light spot is shifted towards the aperture G2. Since, as stated above, the directions of the lines of force of the magnets M1 and M2 are opposite each other, the direction of the magnetic flux supplied from the portion B will be unlike the field of the persistent current around the aperture G2, so that the two fluxes will neutralize each other.

While the invention has been described with respect to specific embodiments, various changes and modifications thereof will be apparent to those skilled in the art without departing from the inventive concept, the scope of which is set forth in the appended claims.

What is claimed is:

1. In combination: a thin layer of superconducting material at a temperature lower than the critical temperature, means for directing a light ray at the surface of said layer, and means for displacing said light ray along said surface.

2. The combination of claim 1, wherein said light ray is displaced to a portion of the surface formed by an aperture in the layer of superconducting material.

3. In combination: a thin layer of superconducting material at a temperature lower than the critical temperature, means for producing a magnetic field at least at one portion along the edge of said layer and at the surface thereof, means for directing a light ray at said portion, and means for displacing said light ray along said surface towards given storage portions thereon.

4. The combination of claim 3, wherein said given storage portions are formed by apertures in the layer of superconducting material.

5. The combination of claim 4, further including a read conductor placed adjacent each of said storage portions.

6. The combination of claim 3, wherein said given storage portions are formed by portions of said layer which are reduced in thickness.

7. In combination: a thin layer of superconducting material at a temperature lower than the critical temperature, means for producing a Meissner spot at one portion of the surface of said layer, means for directing a light ray at said portion, and means for displacing said light ray along said surface.

8. In combination: a thin layer of superconducting material at a temperature lower than the critical temperature, means for producing a first magnetic field at least at one portion along the edge of said layer and at the surface thereof, means for producing a second magnetic field at least at one portion along another edge of said layer and at the surface thereof, the lines of force of said first and second magnetic fields being opposite each other, means for directing a light ray at one of said portions, and means for displacing said light ray along said surface towards given storage portions thereon to produce a Meissner spot thereon.

9. The combination of claim 8, including means for directing a light ray at the other of said portions and displacing said light ray to said Meissner spot, thereby erasing said Meissner spot.

10. The combination of claim 8, further including a read conductor placed adjacent each of said storage portions.

References Cited by the Examiner

UNITED STATES PATENTS 3,096,431  7/1963  Schmidlin _____ 340—173.1

IRVING L. SRAGOW, *Primary Examiner.*